June 18, 1963

R. S. TAYLOR 3,094,301

HEAT PLACEMENT

Filed Aug. 1, 1957

INVENTOR.
Robert S. Taylor
BY
D E Heath
his Attorney

INVENTOR.
Robert S. Taylor
BY
his Attorney

United States Patent Office

3,094,301
Patented June 18, 1963

3,094,301
HEAT PLACEMENT
Robert S. Taylor, Evansville, Ind.
(2906 Cedarview Drive, Austin 4, Tex.)
Filed Aug. 1, 1957, Ser. No. 675,671
1 Claim. (Cl. 244—134)

This invention relates to heat placement and more particularly to surface maintained at temperatures above ambient with metal sheets bonded together by interfacial fusion except for a pattern hydraulically expanded into ducts and connected with a vessel in an hermetically sealed system containing a halogenated hydrocarbon fluid which in liquid phase drains to the vessel where it is heated to keep the duct pattern filled with hot vapor.

The surface may be an interior surface kept warm for processing or comfort, an exterior surface kept warm to prevent icing or snow deposit, or any surface where heat placement is desirable. One application of the invention which I have successfully carried out is aircraft surfaces subject to icing.

There have been four arrangements for combatting ice formation on aircraft airfoil sections. One utilizes inflation and deflation of rubber "boots" to mechanically break-up ice formed on the leading edges of wings and stabilizers. Another utilizes distribution of hot air into the wings. Another utilizes jets of steam within the wings directed against the leading edges. Still another utilizes seepage or squirting of a freezing point depressant, isobutal alcohol, to release ice or prevent its formation. Another arrangement known in the patented art, but not used, utilizes hot water circulated by a pump. All of these arrangements involve such a high cost ratio as to be economically prohibitive in smaller and less expensive aircraft, and in any aircraft the low first cost and the absence of operating cost and maintenance make my arrangement welcome.

The principal objective is to maintain a surface at elevated temperatures with the least of everything—material, labor, operation, and maintenance. This objective is achieved by the invention briefed in the opening paragraph. It is more fully described in its application to aircraft in connection with the accompanying drawings in which.

Figure 1:
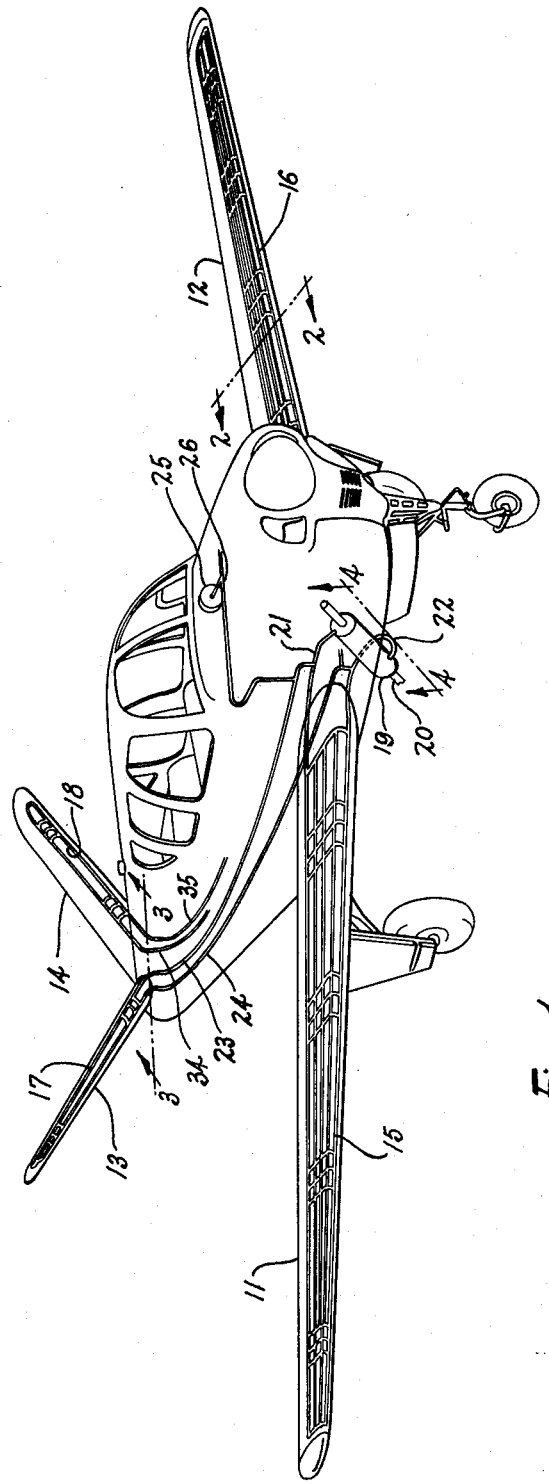
FIG. 1 is a phantom perspective of a single-engine low wing monoplane embodying the invention.

Referring to the drawings, the aircraft shown in FIG. 1 has heated surfaces on the forward edges of the wings 11 and 12 and the forward edges of the stabilizers 13 and 14. This is accomplished in one of three ways. Basically, two sheets of metal such as aluminum are placed flat together with a pattern of nonbonding material between their faces and hot rolled. In known manner, this causes the metal sheets to bond into a single sheet except for the pattern. The latter is opened at one point where hydraulic pressure is introduced. The sheet is restrained in a die such that the pressure expands the pattern into a duct-work on one side of the sheet, the other side being flat.

I fasten this sheet on the inside of an aircraft skin sheet; on the outside; or, as herein shown, use this sheet as the skin sheet on the leading edges of the wings and stabilizers. In FIG. 1 the duct pattern is shown in full outline, the pattern in the right wing, indicated by the reference numeral 15, matching the pattern 16 in the left wing 12, and the pattern 17 in the stabilizer 13 matching the pattern 18 in the other stabilizer 14.

Figure 2:
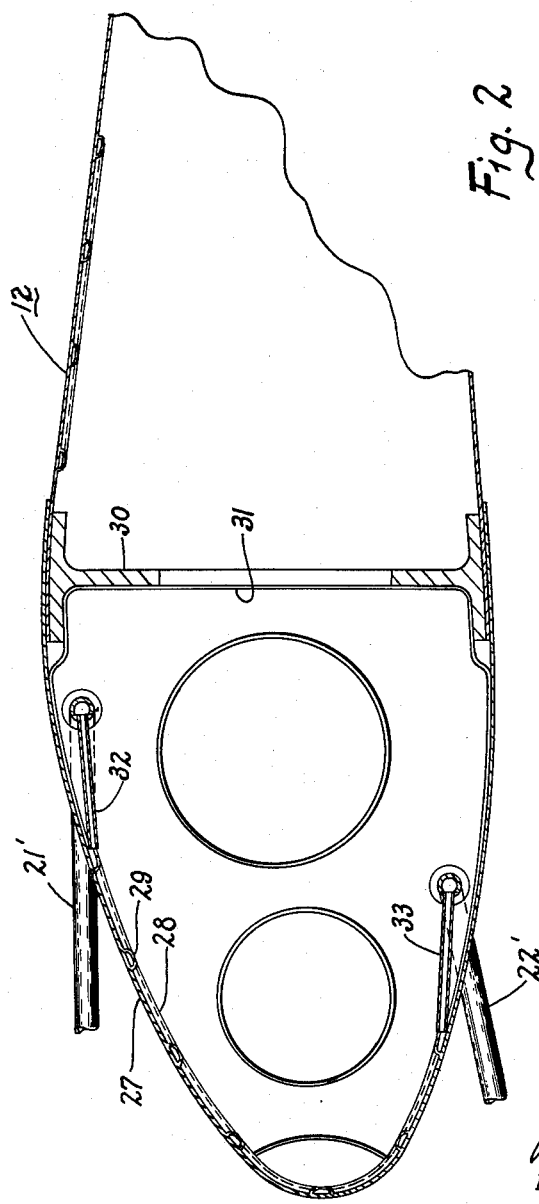
FIG. 2 is a section on line 2—2 in FIG. 1.
Figure 3:
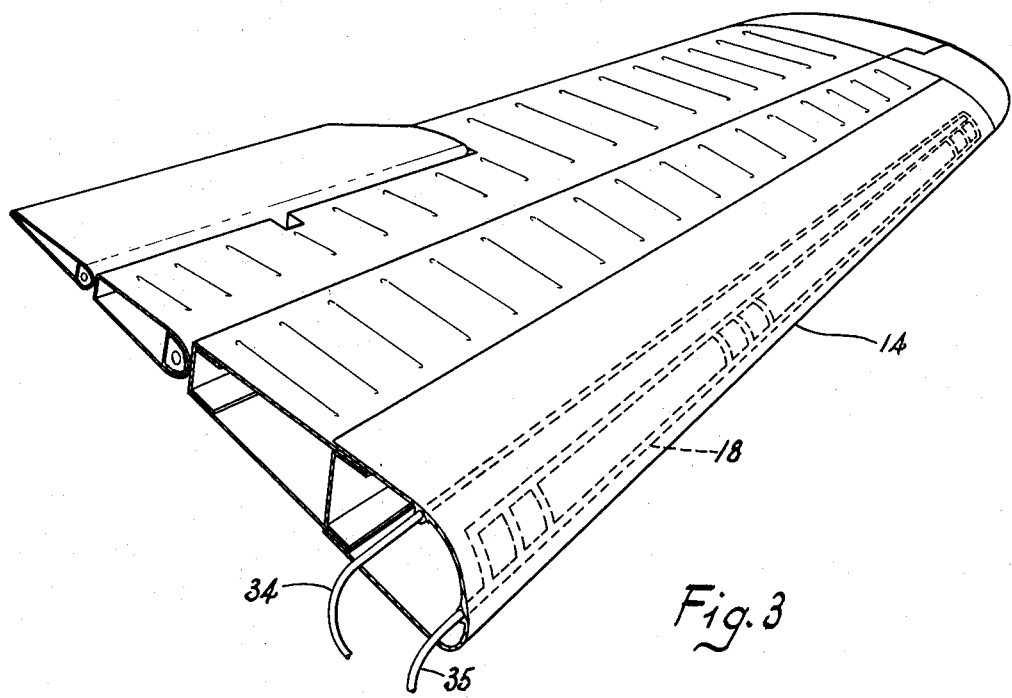
FIG. 3 is a section on line 3—3 in FIG. 1.
Figure 4:
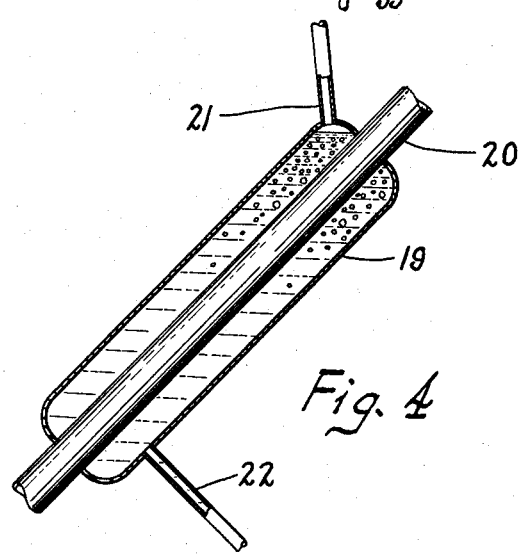
FIG. 4 is a sectional view of the boiler vessel only on line 4—4 in FIG. 1.

The right exhaust 20 of the aircraft engine is arranged in thermal transfer relation with a vessel 19 as shown in FIGS. 1 and 4. The left exhaust is likewise provided with a similar vessel not shown. The duct pattern 15 in the right wing 11 is connected by a liquid line 22 and a vapor line 21 to the bottom and top, respectively, of the vessel 19. The duct pattern 17 in the stabilizer 13 is connected by a vapor line 23 and a liquid line 24 to the vapor line 21 and the liquid line 22 respectively. The duct pattern 16 in the other wing 12 is connected by a vapor line 21′ and a liquid line 22′ as shown in FIG. 2 to the left exhaust boiler, not shown. The duct pattern 18 in the stabilizer 14 is connected by a vapor line 34 and a liquid line 35 to the vapor line 21′ and the liquid line 22′ respectively.

A line 26 connects the vapor lines 23 and 34 to a pressure gage 25 in the cockpit. All of the connections are vapor tight and the several duct patterns with the exhaust heated vessels and connecting lines form an hermetically sealed fluid system. This system is exhausted and then charged with dichlorodifluoromethane, a relatively non-toxic, nonflammable halogenated hydrocarbon. The exhaust heated vessels are located so that there is drainage of liquid thereto from all other parts of the system through the liquid lines.

When the engine is in operation, exhaust heat boils liquid in the boiler vessels and the resulting vapor flows through the vapor lines 21 and 21′ to the several duct patterns. The vapor condenses in the duct patterns and the resulting liquid drains via the liquid lines 22 and 22′ back to the boilers. When an aircraft is properly banked in making a turn the resultant of gravitational force and centrifugal force remains perpendicular to the ship so there is no disturbance of the drainage in the system.

The pressure in the hermetically sealed system is the saturated vapor pressure of $CCl_2F_2$ at the lowest temperature in any part of the system. This pressure can be as high as 250 p.s.i.g. during a take-off on a 120 degree F. day. The pressure gage is desirably calibrated in degrees of temperature to show directly the temperature of the coolest point in the protective system.

Icing conditions are a temperature below about 33 degrees F. and the presence of subcooled water particles. This has been experienced as low as 20 degrees F. and could occur even lower. If a system maintains a 20 degree differential it will protect in most cases. However, my system can be designed to maintain any desired differential with respect to the ambient and thus provide any specified protection.

In FIG. 2 the whole leading edge 27 of the wing 12 is formed by skin sheets containing ducts like duct 29 making up the pattern 16 (FIG. 1) and mounted over the spar 30 and the nose ribs 31. A drain pipe 33 connects the duct pattern to the drain line 22′ and a pipe 32 connects the duct pattern to the vapor line 21′.

The $CCl_2F_2$ vapor continuously supplied to the sheet ducts 29 insures the skin sheets at the desired temperature above ambient when the aircraft is in operation because external cooling calls for latent heat of condensation of the vapor which exceeds the sensible heat loss from the surface up to such differential.

The gage 25 and an ambient thermometer tell at a glance whether or not the system is in order to protect against icing.

Various changes and modifications may be made within the scope of this invention as set forth in the following claim.

What is claimed is:

In an aircraft having external surface requiring freedom from snow and ice, a skin sheet forming such surface, a second sheet having a pattern of contiguous lineal channels and hermetically bonded to said skin sheet to form therewith a pattern of ducts, a vessel so connected to said pattern of ducts as to form therewith an hermetically sealed system, all parts of which are in open and unrestricted intercommunication and contain a halogenated hydrocarbon fluid, said system being so arranged that fluid in liquid phase drains from any and all parts thereof to said vessel, and a heater constructed and arranged to apply heat to said vessel whereby hot vapor is supplied to said pattern of ducts to maintain said skin sheet uniformly at a temperature above ambient, the pattern of ducts and connections of said vessel thereto being so arranged that free flow of vapor to the pattern is not impeded by drainage of liquid to the vessel.

References Cited in the file of this patent

UNITED STATES PATENTS

| | | |
|---|---|---|
| 1,833,847 | Midgley et al. | Nov. 24, 1931 |
| 2,081,963 | Theodorsen et al. | June 1, 1937 |
| 2,084,950 | Downing et al. | June 22, 1937 |
| 2,099,899 | Hedfield et al. | Nov. 23, 1937 |
| 2,110,731 | Horrocks | Mar. 8, 1938 |
| 2,160,397 | Brammer | May 30, 1939 |
| 2,181,276 | Kogel | Nov. 28, 1939 |
| 2,470,128 | Barrick et al. | May 17, 1949 |
| 2,479,307 | Camitti et al. | Aug. 16, 1949 |
| 2,690,002 | Grenell | Sept. 28, 1954 |

OTHER REFERENCES

Aviation Magazine, page 135, August 1943, 244–1.3X.